(12) United States Patent
Bird et al.

(10) Patent No.: US 7,827,608 B2
(45) Date of Patent: Nov. 2, 2010

(54) DATA LEAK PROTECTION SYSTEM, METHOD AND APPARATUS

(75) Inventors: Paul M. Bird, Markham (CA); David L. Kaminsky, Chapel Hill, NC (US); Sam S. Lightstone, Toronto (CA); Walid Rjaibi, Markham (CA)

(73) Assignee: International Business Machines Corporation, Armonk, NY (US)

( * ) Notice: Subject to any disclaimer, the term of this patent is extended or adjusted under 35 U.S.C. 154(b) by 1370 days.

(21) Appl. No.: 11/053,105

(22) Filed: Feb. 8, 2005

(65) Prior Publication Data

US 2006/0179040 A1    Aug. 10, 2006

(51) Int. Cl.
G06F 11/00 (2006.01)
G06F 12/14 (2006.01)
G06F 13/00 (2006.01)
G08B 23/00 (2006.01)

(52) U.S. Cl. .................................. 726/23; 380/200
(58) Field of Classification Search .............. 713/172, 713/200; 726/3, 23; 380/200
See application file for complete search history.

(56) References Cited

U.S. PATENT DOCUMENTS

| | | | |
|---|---|---|---|
| 6,678,282 B2 | 1/2004 | Sharper et al. | |
| 6,711,687 B1* | 3/2004 | Sekiguchi | 726/23 |
| 6,981,146 B1* | 12/2005 | Sheymov | 713/172 |
| 7,197,762 B2* | 3/2007 | Tarquini | 726/3 |
| 7,356,545 B2* | 4/2008 | Muralidharan et al. | 707/103 Y |
| 7,584,303 B2* | 9/2009 | Ricciulli | 709/250 |
| 2002/0010800 A1 | 1/2002 | Riley et al. | |
| 2002/0073313 A1 | 6/2002 | Brown et al. | |
| 2002/0116630 A1 | 8/2002 | Stehlin | |
| 2002/0129140 A1 | 9/2002 | Peled et al. | |
| 2002/0133586 A1 | 9/2002 | Shanklin et al. | |
| 2003/0041266 A1 | 2/2003 | Ke et al. | |
| 2003/0084320 A1* | 5/2003 | Tarquini et al. | 713/200 |
| 2003/0084322 A1* | 5/2003 | Schertz et al. | 713/200 |
| 2003/0084323 A1* | 5/2003 | Gales | 713/200 |
| 2003/0084330 A1* | 5/2003 | Tarquini et al. | 713/200 |
| 2003/0101341 A1 | 5/2003 | Kettler, III et al. | |
| 2003/0110373 A1 | 6/2003 | Champion | |

(Continued)

OTHER PUBLICATIONS

Asheesh Bhatia, Database Intrusion Detection System, Dec. 31, 2004, The University of Auckland, New Zeland, Project No. 83, pp. 1-53.*

(Continued)

*Primary Examiner*—Kambiz Zand
*Assistant Examiner*—Monjour Rahim
(74) *Attorney, Agent, or Firm*—Joseph E. Bracken, Esq.; Steven M. Greenberg, Esq.; Carey Rodriguez Greenberg & Paul LLP

(57) ABSTRACT

A method, system and apparatus for data leak prevention. An information system, such as a database system, which has been configured for data leak protection in accordance with the present invention can include an IDS coupled to the information system and a data leak protection system configured to apply a data leak protection policy for result sets produced by the information system in response to a database query. The data leak protection policy can include a listing of data shapes and corresponding remedial measures. The data leak protection policy further can include consideration for metrics produced by the IDS.

23 Claims, 2 Drawing Sheets

U.S. PATENT DOCUMENTS

| | | |
|---|---|---|
| 2003/0188174 A1 | 10/2003 | Zisowski |
| 2003/0188189 A1 | 10/2003 | Desai et al. |
| 2003/0233575 A1 | 12/2003 | Syrjanen et al. |
| 2004/0030912 A1 | 2/2004 | Merkle, Jr. et al. |
| 2004/0034794 A1 | 2/2004 | Mayer et al. |
| 2006/0150250 A1* | 7/2006 | Lee et al. .................. 726/23 |
| 2007/0300301 A1* | 12/2007 | Cangini et al. ............. 726/23 |
| 2008/0005784 A1* | 1/2008 | Miliefsky ................... 726/3 |

OTHER PUBLICATIONS

Extensible and Configurable Audit Event Types and Classes, IBM Technical Disclosure Bulletin, vol. 34, No. 8, Jan. 1992, pp. 138-141.

* cited by examiner

DATA LEAK PROTECTION SYSTEM, METHOD AND APPARATUS

BACKGROUND OF THE INVENTION

1. Statement of the Technical Field

The present invention relates to the field of database security and more particularly to the remediation of data leak conditions in an information system.

2. Description of the Related Art

Information systems such as database systems have fulfilled a substantial role in computing from the start. From the most basic data driven application, to complex database management systems, end users have always benefited from the ability to cull a subset of desired data from a large corpus of data based upon one or more search terms. Largely due to the efficiency and speed of database systems, whole industries have experienced dramatic gains in efficiency based upon the ability to retrieve desired record sets from vast collections of data.

The advent of the Internet has further accelerated the adoption of information systems among the consuming public. Prior to the wide-scale adoption of Internet based computing, database systems could be accessed and utilized only by a select group of users—insiders to the managing organization. Accordingly, concerns relating to the security of the data in the database could be limited to those limited few having access to the database system and those limited few having access to the physical plant hosting the computing systems which support the database system. Nevertheless, publicly accessible database systems—particularly those employing a Web based interface—have changed the level of vulnerability of database systems to unauthorized intrusions and data leaks.

Generally, to combat the enhanced threat of unauthorized intrusions in a computer communications network, information technologists utilize intrusion detection system (IDS) technology. IDS technology can detect network intrusions dynamically as they occur or post-mortem after the intrusion has occurred. A typical dynamic network IDS can include a monitoring component able to capture network packets as the packets pass through the IDS, an inference component for determining whether the captured traffic indicates any malicious activity or usage, and a response component able to react appropriately to the detection of a malicious intrusion. While the response can include the generation and transmission of a simple e-mail message to a system administrator, the response also can include more complex actions, for instance temporarily blocking traffic flowing from an offenders Internet protocol (IP) address.

Conventional IDS technology can incorporate a variety of methodologies for determining within the inference component whether malicious activity has occurred or is occurring. Referred to as "detection methodologies", examples can include simple pattern matching, stateful pattern matching, protocol decode-based signatures, heuristic-based signatures, and anomaly detection. Stateful pattern matching is an enhanced, more mature version of simple pattern matching based upon the notion that a stream of network traffic includes more than mere stand-alone packets. Protocol decode-based analysis, in turn, has been considered to be an intelligent extension to stateful pattern matching. In protocol decode-based analysis, traffic first is decoded in real-time according to a specified protocol such as HTTP in order to identify the pertinent fields of the protocol. Once the fields of the traffic specified by the protocol have been decoded, pattern matching can be applied to the decoded fields.

Unlike intrusion detection techniques which rely directly upon pattern matching, a heuristic-based analysis employs algorithmic logic upon which intrusion detection signatures can be based. Typically, the algorithmic logic can analyze traffic patterns in order to match a particular traffic pattern with a known "signature". Of course, any heuristic-based analysis can report false positives where a pattern of legitimate access to a network device satisfies the algorithmic logic. Hence, the use of a heuristic-based analysis requires extensive and frequent tuning to limit such false positives. Similar to the heuristic-based analysis, in an anomaly-based analysis, traffic can be dynamically inspected as the traffic passes through the IDS. In an anomaly-based analysis, however, traffic patterns can be analyzed to detect anomalous behavior.

Despite the advancement of IDS technologies, IDS technologies alone cannot account for data leak vulnerabilities. A data leak refers to the unintentional dissemination of data in a database system through the failure of a database system to secure data for viewing only by authorized parties. For example, simple queries using widely accessible search engine Web sites can produce references to a handful of Web sites that have posted credit card information to the Web. The lists of financial information include hundreds of names for respective card holders, addresses and phone numbers as well as credit card data. Some news media outlets have referred to this security breach as an example of "Google hacking". As it will be apparent from this example, knowledgeable net surfers can obtain sensitive information simply by mining the world's best-known search engine.

There is no shortage of ways to search popular search engines to find sensitive data. Entire Web sites specify how to search for financial information and describe software vulnerabilities and vulnerable configurations, Web servers and database systems. Popular search engines remain the tool of choice because of the powerful search options provided by often used search engines, such as the ability to search for a range of numbers which can be useful in finding credit card data. As a general pattern, however, malicious hackers simply can toss a large net into the sea of data by generating search queries aimed at producing large result sets most likely to contain rich quantities of sensitive data.

SUMMARY OF THE INVENTION

The present invention addresses the deficiencies of the art in respect to database systems and provides a novel and non-obvious method, system and apparatus for data leak prevention. An information system such as a database system which has been configured for data leak protection in accordance with the present invention can include an IDS coupled to the database system and a data leak protection system configured to apply a data leak protection policy for result sets produced by the database system in response to a database query.

The data leak protection policy can include a listing of data shapes and corresponding remedial measures. The data leak protection policy further can include consideration for metrics produced by the IDS. The data shapes can be stateless functions of data included in each of the result sets. Alternatively, the data shapes can be stateful functions of data included across multiple ones of the result sets. In either case, the data leak protection policy further can include a specification of user permissions.

A data leak protection method can include the step of limiting a response to a database query based upon the shape of a result set produced by the database query, metrics produced by an IDS for the database query, and a data leak protection policy specifying a set of limitations for a corresponding set of shapes and metrics. The limiting step can include receiving a result set produced by a database query; characterizing a shape of the result set; comparing the shape to pre-specified shapes to identify a matching shape; retrieving a remedial measure corresponding to the matching shape; and, applying the remedial measure.

Notably, the characterizing step can include processing at least one of a stateless function for data in the result, a stateful function for data in multiple result sets, a stateful function for the metrics produced by the IDS, and a stateless function for the metrics produced by the IDS. In any case, the applying step can include quashing the result set, or where appropriate, disconnecting a user issuing the database query. Conversely, the applying step can include returning the result set in its entirety. Intermediately, the applying step yet further can include pruning the result set.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a method, system and apparatus for data leak protection. In accordance with the present invention, a data query can be received and processed within an IDS and a data leak protection system. The IDS can process the data query to produce IDS metrics for the request and can characterize the request as one of an intrusion or legitimate. To the extent that the request has been characterized as an intrusion, the request can be quashed. Otherwise, the request can be passed to the data leak protection system. The data leak protection system, like the IDS, can characterize the request as one of an attempt to hack a database to which the request is directed, or as legitimate.

Specifically, when initially permitted by the IDS, the data query can be processed against the database to produce a result set of data. The shape of the result set can be characterized by the data leak protection system to detect a matching condition indicative of a hacking attempt. Responsive to a matching condition and considering the conclusions of the IDS, a policy for the matching condition can be retrieved and a remedial measure for the matching condition can be determined. The remedial measure can include, by way of example, the pruning of the result set, the quashing of the result set, or the termination of the connection with the requesting party. In any case, subsequent to the determination of the remedial measure, the remedial measure can be applied to avoid data leakage.

Figure 1:
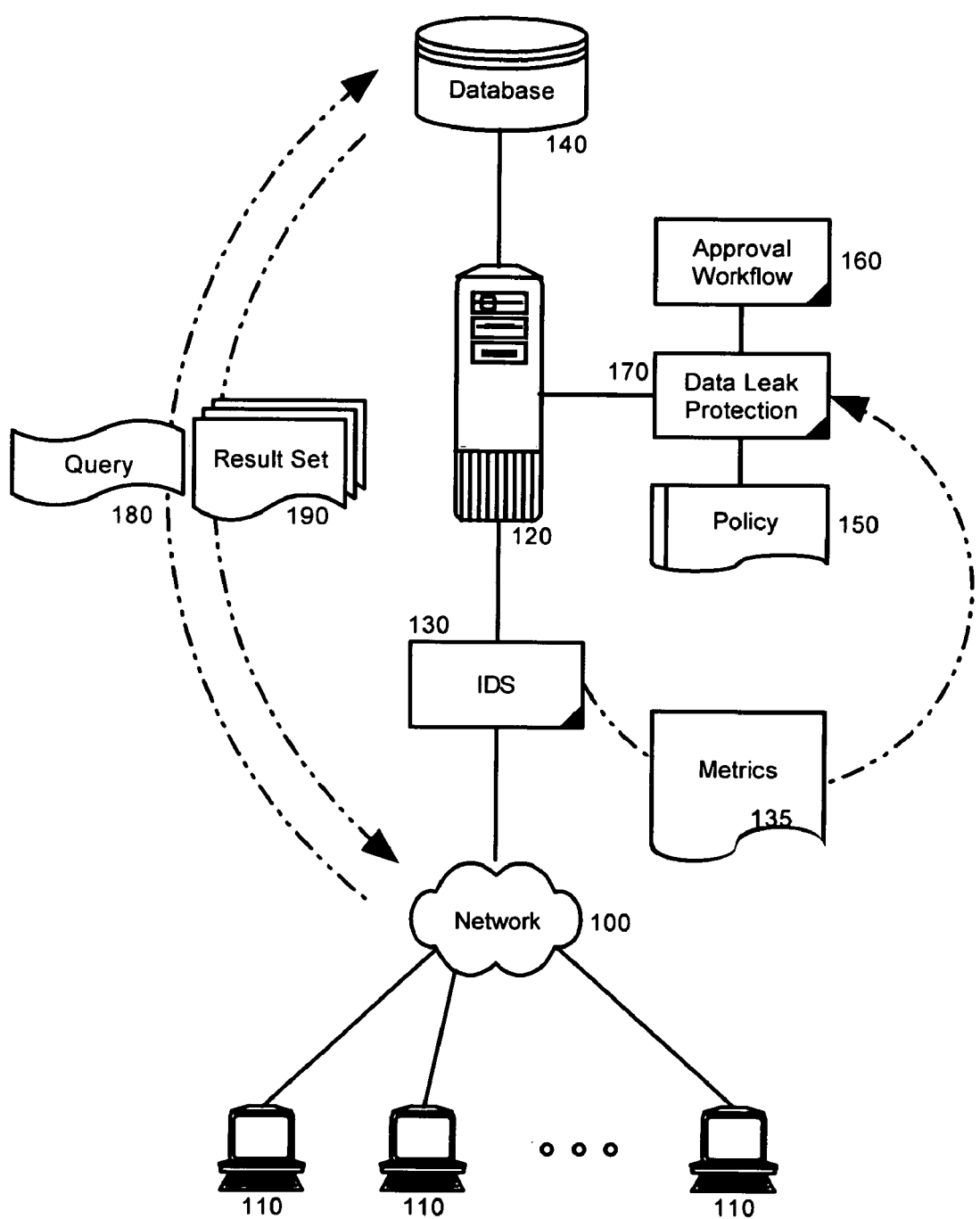
FIG. 1 is a schematic diagram illustrating a database system configured for data leak protection in accordance with the present invention; and, FIG. 2 is a flow chart illustrating a process for data leak protection in the system of FIG. 1.

In further illustration of a particular aspect of the present invention, FIG. 1 is a schematic diagram illustrating a database system configured for data leak protection in accordance with the present invention. The system can include a database server 120 or other information system coupled to one or more query clients 110 over the computer communications network 100, for instance the global Internet. An IDS 130 can be coupled to the communications path between the database server 120 and the computer communications network 100. The database server 120 can be communicatively linked to one or more databases 140 (only a single database shown for simplicity of illustration). In this regard, the database server can be configured to process database queries by the query clients 110 against data stored in the database 140.

Importantly, the database server 120 can be coupled to data leak protection logic 170. The data leak protection logic 170 can be programmed to allow, limit or quash the delivery of a result set 190 by the database server 120 to a requesting one of the query clients 110 based upon a database query 180 provided by the requesting one of the query clients in response to the database query 180. More particularly, the data leak protection logic 170 can be programmed to perform the allowance, limitation or quashing action based upon data disclosure rules disposed in a policy 150.

The rules in the policy 150 can account not only for the shape of the data produced by the query 180, but also for metrics 135 produced by the IDS 130. Examples can include those rules provided as a function of the data in the result set 190 such as "more than N entries retrieved from column X (credit card number) of the database, or M entries from columns Y and Z (name of card holder and credit card number) of the database. Moreover, the rules can be stateful, or the rules can be stateless such as "more than N credit card numbers within X seconds or Y queries". Finally, the rules can be correlated with the metrics 135 from the IDS 130 such as "N probes followed by data of a certain shape." In any event, when the rules in the policy 150 indicate that a remedial action should be taken for the query 180, an approval workflow 160 can process the query 180 to determine an appropriate remedial measure which can include an approval of the result set 190 to a quashing of the result set 190.

Figure 2:
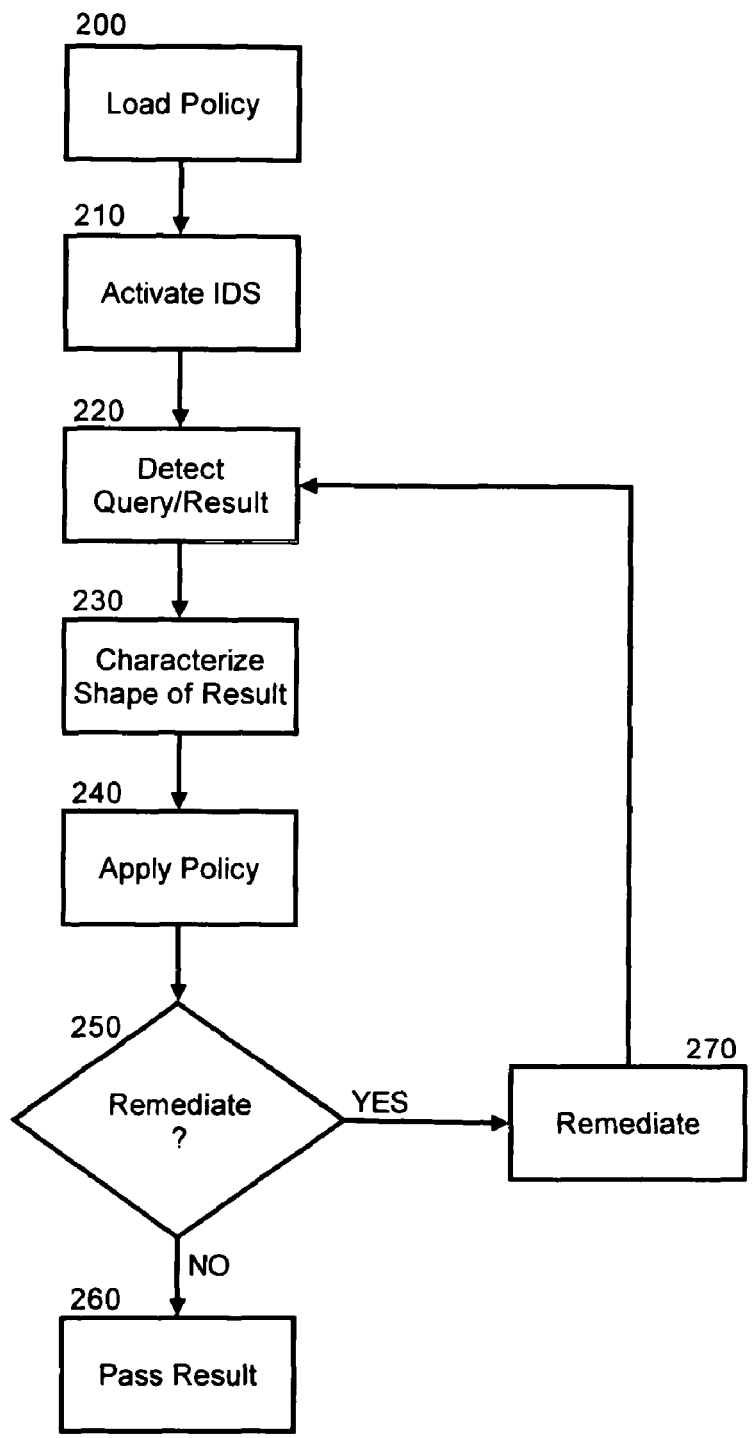

In more specific illustration of the operation of the data leak protection logic 170, FIG. 2 is a flow chart illustrating a process for data leak protection in the system of FIG. 1. Beginning in block 200, a data leak protection policy can be retrieved and loaded for use in the data leak protection process. The data leak protection policy can include a description of a data shape, and a corresponding remedial action. The data shape can be a characterization of a result set, such as a result set which includes more than a threshold number of credit card numbers, or a result set that includes more than a threshold number of name/number pairs, to name only two examples.

Remedial actions, by comparison, can specify limitations on providing the result set to a querying client and can include by way of example the requirement that the querying client sign off the system without returning the result set to the querying client, terminating the query in its entirety, pruning the result set, and altering the shape of the result set. Other remedial measures also can be included such as requiring a further level of user authentication though the foregoing list of remedial measures is to be considered exhaustive by any means. Of course, where appropriate, an acceptable remedial measure can include the passing of the result set to the querying client without limitation.

In any event, in block 210, an IDS can be activated to process incoming network requests in order to detect network intrusions. Where intrusions are detected, the IDS can quash the network requests, or the IDS merely can log the suspected intrusion while allowing the request to pass into the database system. In either case, however, a set of IDS metrics can be produced and maintained for each network request, both individually and in the aggregate. The IDS metrics further can be exposed for access by the logic of the data leak protection system To the extent that the IDS permits passage of a network request, in block 220 a query can be received in the database system and a result set can be produced based upon the query. In block 230, the shape of the result set can be characterized and in block 240, a policy which matches the shape of the result set as well as the IDS metrics can be applied to determine whether remedial action is required. Optionally, the application of the policy can be constrained by a user name or specific user permissions for the querying client. In decision block 250, if remedial action is required, in block 270 the corresponding remedial action can be undertaken. Otherwise, in block 260 the result set can be passed to the querying client without limitation.

The present invention can be realized in hardware, software, or a combination or hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A data leak protection method comprising:
   receiving a database query;
   producing metrics, by an intrusion detection system (IDS), for said database query;
   receiving the result set produced by said database query; and
   limiting a response to said database query based upon:
      a shape of said result set produced by said database query,
      said metrics, and
      a data leak protection policy specifying a set of limitations for a corresponding set of shapes and metrics.

2. The method of claim 1, wherein said limiting comprises:
   characterizing said shape of said result set;
   comparing said shape to pre-specified shapes to identify a matching shape;
   retrieving a remedial measure corresponding to said matching shape; and,
   applying said remedial measure.

3. The method of claim 1, wherein said shape of said result set is characterized by at least two characteristics of said result set.

4. The method of claim 2, wherein said characterizing comprises processing at least one of
   a stateless function for data in said result,
   a stateful function for data in multiple result sets,
   a stateful function for said metrics produced by said IDS, and
   a stateless function for said metrics produced by said IDS.

5. The method of claim 2, wherein said applying comprises quashing said result set.

6. The method of claim 2, wherein said applying comprises returning said result set in its entirety.

7. The method of claim 2, wherein said applying comprises pruning said result set.

8. The method of claim 2, wherein said applying comprises disconnecting a user issuing said database query.

9. A machine readable storage having stored thereon a computer program for data leak protection, the computer program comprising a routine set of instructions which when executed by a machine causes the machine to perform:
   receiving a database query;
   producing metrics, by an intrusion detection system (IDS), for said database query;
   receiving the result set produced by said database query; and
   limiting a response to said database query based upon:
      a shape of said result set produced by said database query,
      said metrics, and
      a data leak protection policy specifying a set of limitations for a corresponding set of shapes and metrics.

10. The machine readable storage of claim 9, wherein said limiting comprises:
    characterizing said shape of said result set;
    comparing said shape to pre-specified shapes to identify a matching shape;
    retrieving a remedial measure corresponding to said matching shape; and,
    applying said remedial measure.

11. The machine readable storage of claim 9, wherein said shape of said result set is characterized by at least two characteristics of said result set.

12. The machine readable storage of claim 10, wherein said characterizing comprises processing at least one of
    a stateless function for data in said result,
    a stateful function for data in multiple result sets,
    a stateful function for said metrics produced by said IDS, and
    a stateless function for said metrics produced by said IDS.

13. The machine readable storage of claim 10, wherein said applying comprises quashing said result set.

14. The machine readable storage of claim 10, wherein said applying comprises returning said result set in its entirety.

15. The machine readable storage of claim 10, wherein said applying comprises pruning said result set.

16. The machine readable storage of claim 10, wherein said applying comprises disconnecting a user issuing said database query.

17. An information hardware system configured for data leak protection comprising:
- a database server configured to receive a database query and produce a result set for the database query;
- an intrusion detection system (IDS) coupled to said database server; and,
- a data leak protection system configured to limit a response to the database query based upon:
  - a shape of the result set produced by said database query,
  - a data leak protection policy specifying a set of limitations for a corresponding set of shapes and metrics.

18. The system of claim 17, wherein the data leak protection policy comprises a listing of data shapes and corresponding remedial measures.

19. The system of claim 17, wherein the data leak protection policy further comprises consideration for metrics produced by the IDS.

20. The system of claim 17, wherein the information hardware system is a database hardware system.

21. The system of claim 17, wherein said shape of said result set is characterized by at least two characteristics of said result set.

22. The system of claim 18, wherein the data shapes are stateless functions of data included in each of the result sets.

23. The system of claim 18, wherein the data shapes are stateful functions of data included across multiple ones of the result sets.

* * * * *